May 28, 1963 R. WIKEN 3,091,389
SLIDE RULE GEAR SELECTOR
Filed Jan. 5, 1961 4 Sheets-Sheet 1
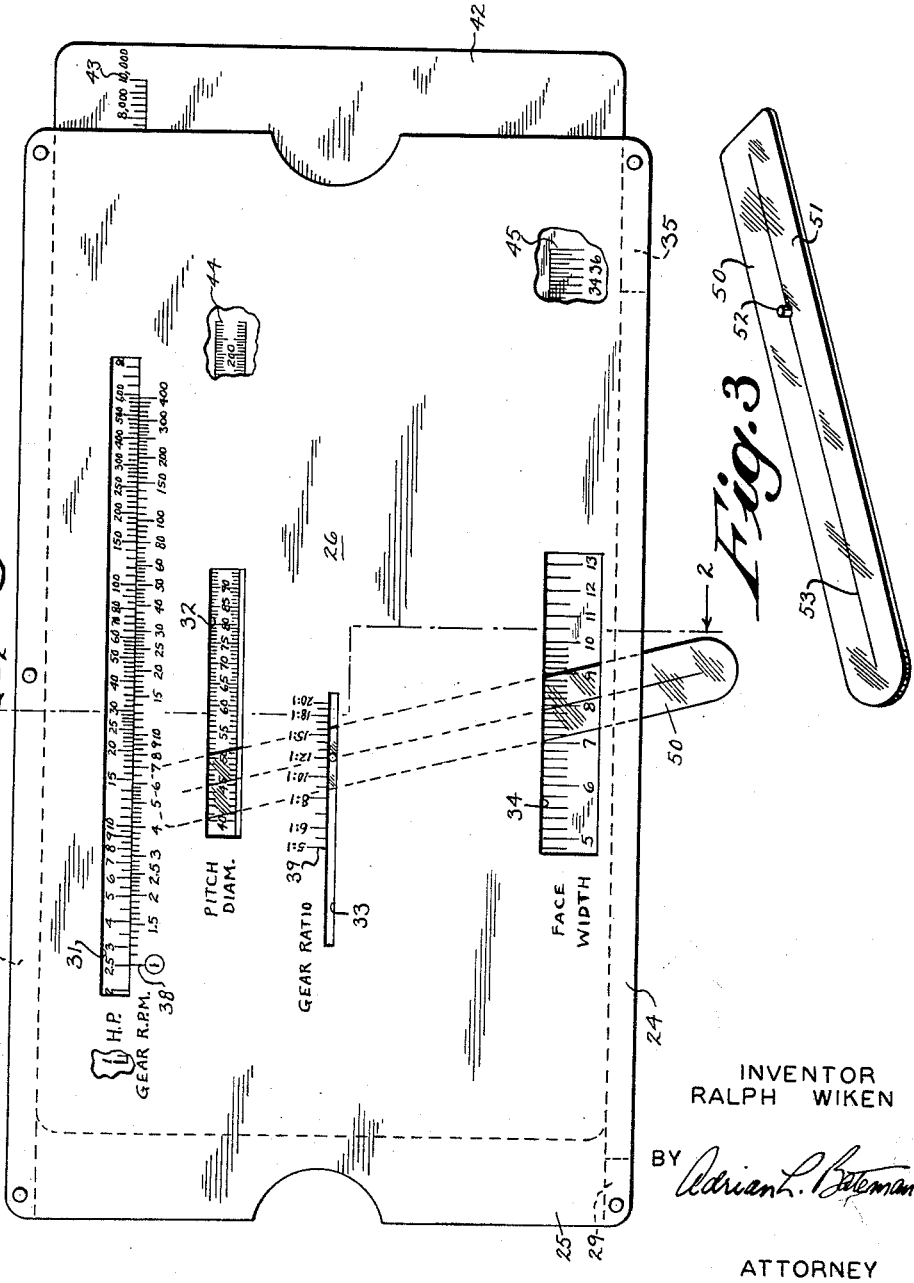
INVENTOR
RALPH WIKEN
BY
ATTORNEY May 28, 1963
R. WIKEN
3,091,389
SLIDE RULE GEAR SELECTOR
Filed Jan. 5, 1961
4 Sheets-Sheet 2
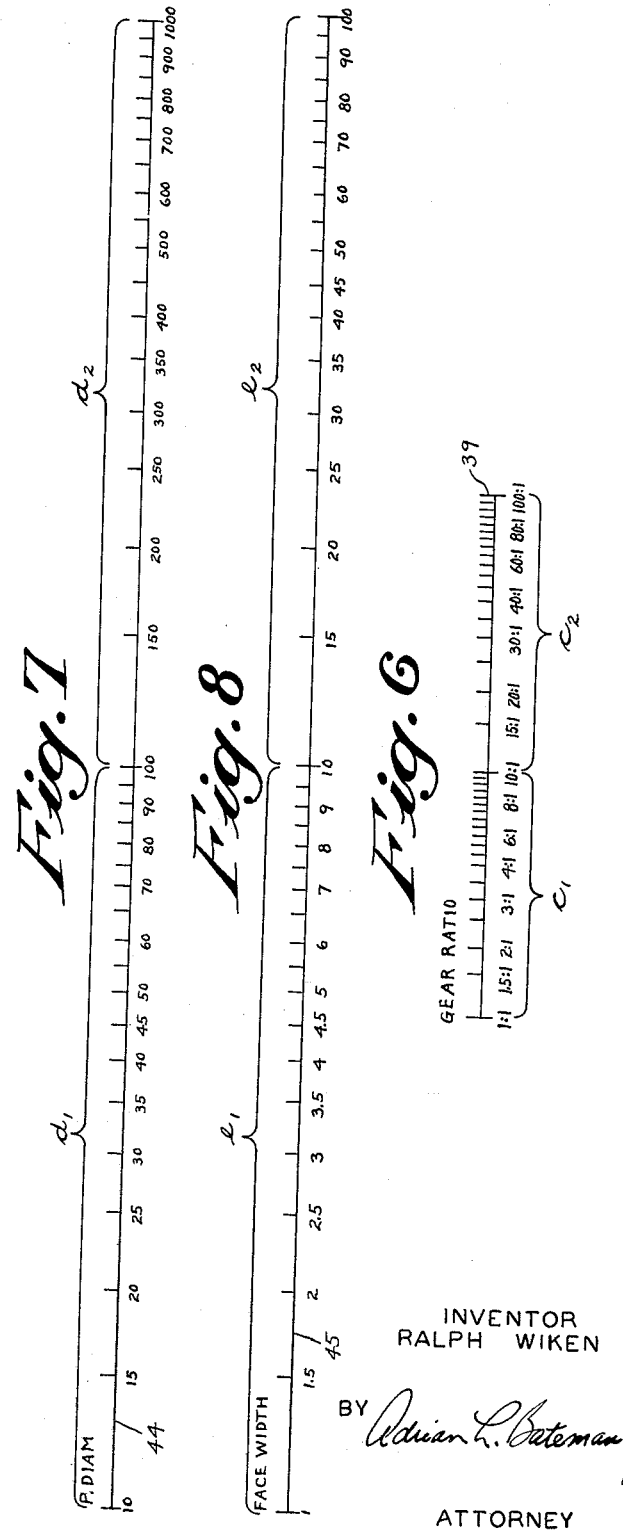
INVENTOR
RALPH WIKEN
BY *Adrian L. Bateman, Jr.*
ATTORNEY May 28, 1963

R. WIKEN 3,091,389

SLIDE RULE GEAR SELECTOR

Filed Jan. 5, 1961

INVENTOR
RALPH WIKEN

BY *Adrian L. Bateman, Jr.*

ATTORNEY

May 28, 1963
R. WIKEN
3,091,389
SLIDE RULE GEAR SELECTOR
Filed Jan. 5, 1961
4 Sheets-Sheet 4
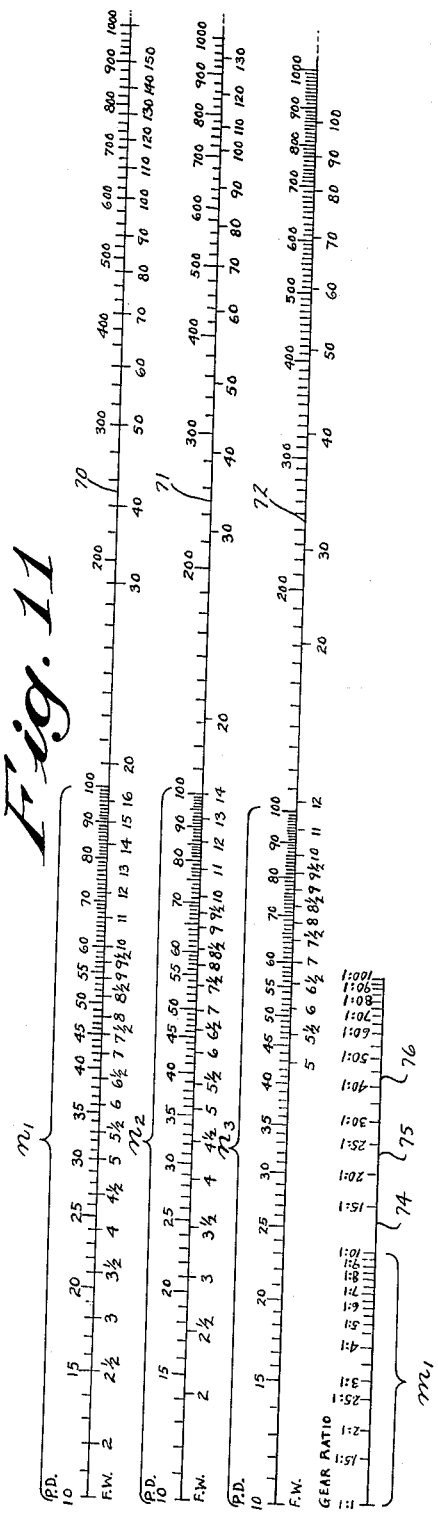
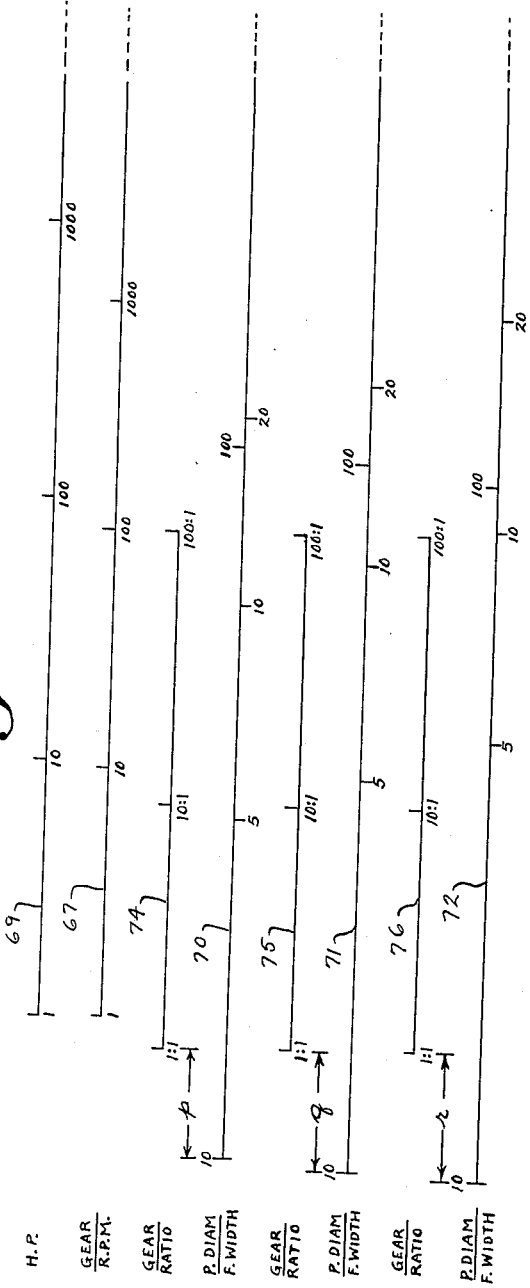
INVENTOR
RALPH WIKEN
BY *Adrian L. Bateman, Jr*
ATTORNEY

United States Patent Office 3,091,389
Patented May 28, 1963

3,091,389
SLIDE RULE GEAR SELECTOR
Ralph Wiken, Bayside, Wis., assignor to The Falk Corporation, Milwaukee, Wis., a corporation of Wisconsin
Filed Jan. 5, 1961, Ser. No. 80,835
5 Claims. (Cl. 235—61)

This invention relates to slide rules and, more particularly, to slide rules which are adapted to facilitate the selection of gears suitable for specific power transmission applications.

The choice of power transmission gears for a particular application presents a difficult problem, especially with regard to selecting gears durable enough to withstand the mechanical forces likely to be encountered. This selection of gears involves, generally, a determination of the maximum load to which the gears may be subjected and then calculation of appropriate gear dimensions required of a gear that will be capable of withstanding this applied load over a satisfactory life span. Surface durability rating formulae developed by the American Gear Manufacturers' Association (hereinafter referred to as AGMA) are in general use to establish load limitations for gears of various sizes, tooth forms, etc. From these AGMA surface durability rating formulae, the maximum load which a gear of a given size and configuration can withstand without excessive wear of the tooth surfaces can be calculated. Gear loadings in excess of those recommended by AGMA cause excessive wear and pitting of the tooth surfaces and markedly shorten the useful life of the gear. Therefore, selection of gear dimensions which will provide a gear with an AGMA surface durability rating that equals or exceeds that recommended by AGMA practice for the specific application under consideration will normally result in a maximum length of continuous satisfactory gear service.

The AGMA surface durability rating formula, when written with respect to the gear, for helical and double helical gears is:

$$HP = \frac{CmCqCcCvNgDg^2FCi}{126,000\ (Mg+1)}$$

Where:

$HP$ = transmitted horsepower
$Cm$ = the materials factor
$Cq$ = contact length factor
$Cc$ = tooth form factor
$Cv$ = the velocity factor
$Ci$ = inbuilt factor (given as a function of the face width)
$Ng$ = gear r.p.m.
$Dg$ = gear diameter
$F$ = face width
$Mg$ = gear ratio Through the use of the above formula, the horsepower durability rating of a helical, herringbone or double helical gear of a given involute tooth form, material, hardness, face width and pitch diameter, can be calculated for any specified gear ratio and r.p.m. within the speed limitations established by AGMA. The calculations involved are tedious and time-consuming since the various factors must be sought from charts or tables. Thus, it is highly inconvenient for one, not highly versed in the selection of gearing, faced with the problem of selecting properly designed gears for a given application to base his selection of appropriate gear proportions on trial and error substitution in the above empirical formula.

Accordingly, the principal object of this invention is to provide a slide rule calculator, having sliding and stationary members and cooperating scales thereon, adapted to permit rapid and convenient selection of gears which will have a surface durability rating, under AGMA standards, appropriate to the contemplated operating conditions.

Another object of this invention is to provide a slide rule calculator adapted to permit the determination of pitch diameter and face width for gears of a given material and tooth configuration, and to thereby enable the selection of gears which will have maximum gear life in accordance with generally accepted engineering standards, under the conditions of horsepower loading, gear r.p.m. and gear ratio likely to be encountered in the application under consideration.

In summary, the invention includes a slide rule calculator with horsepower loading, gear r.p.m., gear ratio, pitch diameter and face width scales on cooperating relatively movable sliding and stationary members, whereby relative movement of the members will permit the selection of a gear having a pitch diameter and face width suitable for known values of horsepower loading, gear r.p.m., and gear ratio.

The foregoing and other objects and advantages of this invention will become apparent from the following description and by reference to the accompanying drawings forming a part hereof in which there is set forth, by way of illustration and not of limitation, several forms in which the features of this invention may be embodied.

In the drawings:

FIG. 1 is a front elevation view of a slide rule gear selector embodying the features of the invention;

FIG. 2 is a vertical sectional view taken along the plane of line 2—2 of FIG. 1, looking in the direction of the arrows;

FIG. 3 is a perspective view of the pointer member of the slide rule gear selector shown in FIG. 1;

FIG. 4 is a schematic view of the horsepower scale of the gear selector shown in FIG. 1;

FIG. 5 is a schematic view of the gear r.p.m. scale of the gear selector shown in FIG. 1;

FIG. 6 is a schematic view of the gear ratio scale of the gear selector shown in FIG. 1;

FIG. 7 is a schematic view of the pitch diameter (in inches) scale of the gear selector shown in FIG. 1;

FIG. 8 is a schematic view of the face width (in inches) scale of the gear selector shown in FIG. 1;

FIG. 11 is a schematic view of some of the scales of the gear selector shown in FIG. 10; and FIG. 12 is a schematic view showing the relative longitudinal alignment of the scales of the gear selector shown in FIG. 10.

Figure 9:
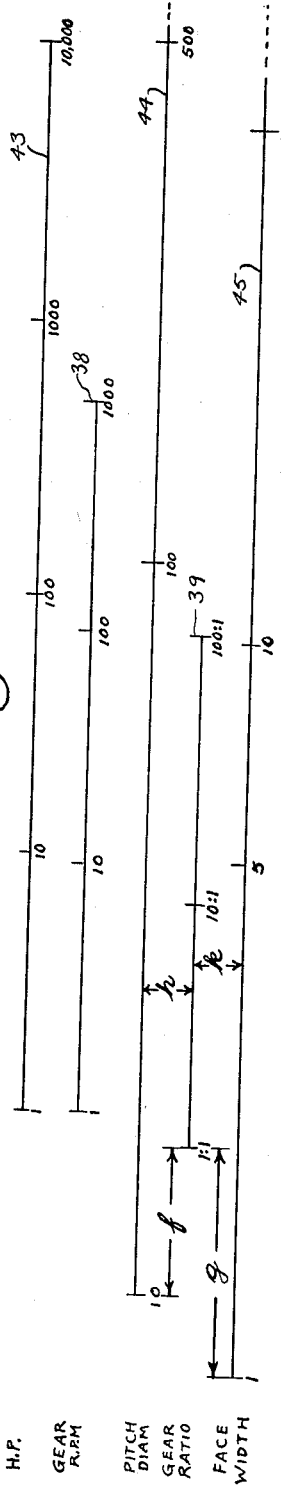
FIG. 9 is a schematic view showing the relative longitudinal and lateral alignment of the scales of the gear selector shown in FIG. 1.

For clarity and completeness, the following description points out details of four embodiments of the present invention from which description those skilled in the art will be able to construct other embodiments.

The embodiments described are universal gear selectors for both 25° and 20° pressure angle tooth forms and specialized gear selectors for both 25° and 20° pressure angle tooth forms. The embodiments selected for description are exemplary only and are not intended to limit the scope of the present invention to the specific forms illustrated and described.

I. THE UNIVERSAL GEAR SELECTOR

A. *Slide Rule Gear Selector for 25° Pressure Angle Full Depth Tooth Form, Single Helical and Double Helical Gears*

FIGURES 1 through 9 illustrate various features of a slide rule gear selector, constructed in accordance with the present invention, for the selection of gears having a 25° pressure angle involute tooth form. For convenience, the following description is divided into three parts: first, a general description of the gear selector, second, a description of the scales employed and the calibration thereof and third, a description of the alignment of the various scales on the structural elements.

1. *General description.*—Referring to FIGS. 1 through 3, there is illustrated a slide rule gear selector 24 comprising an outer case 25, a slide member 42 and a pointer 50. The outer case 25 is formed of a front panel 26 and a rear panel 27 joined along their top longitudinal edge portions to a spacer 28 and joined along a portion of their lower edge portions to a pair of spacers 29 and 35 (see dotted lines in FIG. 1). The panel members and spacers cooperate to define a longitudinal channel 30. Three window openings, 31, 32 and a narrow slot 33 and 34 are cut or otherwise provided in the front panel 26 of the outer case 25. A gear r.p.m. scale 38 is provided on the front panel 26 of the outer case 25 adjacent window 31, the length of window 31 preferably being equal to or greater than the length of the gear r.p.m. scale 38. A gear ratio scale 39 is provided on the front panel 26 adjacent slot 33, the slot 33 being preferably slightly greater in length than the gear ratio scale 39. The slide member 42 is adapted for longitudinal sliding movement within the channel 30 formed between the front and rear panels of the outer case 25 and spacers 28, 29 and 35. The slide member 42 has three scales provided thereon, a horsepower scale 43, a pitch diameter scale 44 and a face width scale 45. As indicated in FIG. 1, the windows 31, 32 and 34 of the outer case 25 are arranged to permit viewing of scales 43, 44 and 45, respectively, of the slide member 42 when the slide is inserted in its operative position within the outer case 25.

Referring now to FIG. 3, there is shown a pointer 50 comprising an elongated and relatively thin base 51 having a projecting cylindrical pivot pin 52 fixedly secured intermediate its ends. The base 51 of the pointer is preferably constructed of a transparent material with a visible hairline 53 provided thereon, the axis of the pivot pin 52 being disposed along said hairline 53. As shown in FIGS. 1 and 2, the pointer 50 is positioned between the slide member 42 and the front panel 26 of the outer case 25, with the pivot pin 52 of the pointer projecting through window 33 of the front panel. The width of the window 33 should be narrow enough to provide a relatively snug fit for pivot pin 52 but wide enough to permit both longitudinal sliding and pivotal movement of pointer 50. One end of the pointer 50 may project beyond the lower edge of the case 25, extending through the longitudinal space between spacers 29 and 35.

The materials from which the various elements heretofore described are fabricated are not critical and form no part of the present invention. Similarly, the manner in which the various scales are applied is not critical and forms no part of the invention. Those skilled in the art will know that the ultimate accuracy of the slide rule will depend upon the moisture and temperature stability of the structural elements and upon the tolerance allowed in applying the scales to such elements.

2. *Scale calibration.*—Illustrated in FIGS. 4 through 8 are five scales which are used in conjunction with the structural members described previously to construct a gear selector in accordance with this invention; a horsepower scale 43 (FIG. 4), a gear r.p.m. scale 38 (FIG. 5), a gear ratio scale 39 (FIG. 6), a pitch diameter scale 44 calibrated in inches (FIG. 7), and a face width scale 45 calibrated in inches (FIG. 8).

The horsepower, gear r.p.m. and gear ratio scales are non-uniform logarithmic scales wherein the lengths of successive logarithmic cycles of the variable plotted either progressively decrease or progressively increase. That is, the lengths of successive logarithmic cycles on each of these three scales are varied according to a geometric progression, wherein the length of each logarithmic cycle bears a constant ratio to the length of the preceding logarithmic cycle on any particular scale. For convenience this ratio, which is different for each of these three scales, is herein denominated the "cycle multiplier" and for those scales wherein the cycle multiplier is greater than 1, successive logarithmic cycles of the variable plotted thereon will progressively increase in length; conversely, successive logarithmic cycles will progressively decrease in length on those scales which have a cycle multiplier less than 1.

The pitch diameter and face width scales, 44 and 45, shown in FIGS. 7 and 8, respectively, are uniform logarithmic scales wherein each logarithmic cycle of the variable plotted has the same length, although the logarithmic cycles of the pitch diameter scale are not equal in length to the logarithmic cycles of the face width scale. Thus, for each of these two scales, the "cycle multiplier" is equal to 1.0.

To establish the relative lengths of each of the five scales, it is convenient to choose the length of a logarithmic cycle of one of the scales as the "base unit" and to express the length of the first logarithmic cycle of each of the other scales as a multiple of this unit. Accordingly, the length of the first logarithmic cycle of the horsepower scale 43, for horsepower values ranging from 1 to 10, is adopted as the "base unit" in this description and is shown as $a_1$ in FIG. 4.

A "length factor" for each scale expresses the ratio of the length of the first logarithmic cycle of any specific scale to the "base unit." As indicated in FIGS. 4 through 8, respectively, the first logarithmic cycles of the horsepower scale 43, gear r.p.m. scale 38, and face width scale 45 encompasses values of the variable plotted ranging from 1 to 10. The first logarithmic cycle of the gear ratio scale 39 covers values from 1:1 to 10:1, and that for the pitch diameter scale 44 covers pitch diameter values ranging from 10″ to 100″.

Table I summarizes the data for the "cycle multiplier" and the "length factors" for each scale, from which it is possible to lay out suitably calibrated scales of the proper length in order to construct a gear selector slide rule in accordance with this invention.

TABLE I

| Scale | Range of Values of First Log Cycle | Length of First Log Cycle (Figs. 4-8) | Length Factor | Cycle Multiplier |
|---|---|---|---|---|
| H.P. | 1 to 10 | $a_1$ | ("base unit") | 1.024 |
| Gear, r.p.m. | 1 to 10 | $b_1$ | 0.969 | 0.948 |
| Gear Ratio | 1:1 to 10:1 | $c_1$ | 0.934 | 1.136 |
| Pitch Diameter (inches) | 10 to 100 | $d_1$ | 2.838 | 1.00 |
| Face Width | 1 to 10 | $e_1$ | 2.835 | 1.00 |

To illustrate the use of table I, with the horsepower scale as an example, the first logarithmic cycle of the horsepower scale, for horsepower values ranging from 1 to 10, would have a length equal to $(a_1)$ which may be any suitable length depending upon the size desired for the slide rule calculator. The second logarithmic cycle $(a_2)$ of the horsepower scale, for horsepower values ranging from 10 to 100, would then have a length of $1.024 \times (a_1)$; the third logarithmic cycle $(a_3)$, wherein horsepower varied from 100 to 1,000, would have a length of $1.024 \times 1.024 \times (a_1)$ or $1.024 \times (a_2)$; the fourth logarithmic cycle $(a_4)$, wherein horsepower varied from 1,000 to 10,000, would have a length of $1.024 \times 1.024 \times 1.024 \times (a_1)$ or $1.024 \times (a_3)$; etc. The length of the first logarithmic cycle of each of the other scales may be determined relative to the length chosen for the first logarithmic cycle of the horsepower scale, $(a_1)$, by multiplying $(a_1)$ by the "length factor" given in the fourth column of table I for each of the respective scales. For example, the length of the first logarithmic cycle of the gear r.p.m. scale ($b_1$) equals $0.969 \times (a_1)$. After having determined the length of the first log cycle of any particular scale in this manner, the length of succeeding log cycles of that scale may then be determined using the appropriate "cycle multiplier" selected from the table I in the manner described above for the horsepower scale. Thus, the length of the second logarithmic cycle of the gear r.p.m. scale ($b_2$) equals $0.948 \times (b_1)$, and the length of the third logarithmic cycle ($b_3$) equals $0.948 \times (b_2)$.

The scales, as illustrated in FIGS. 4 through 8, have been calibrated with the major subdivisions of each logarithmic cycle corresponding to powers of 10, that is 1–10, 10–100, 100–1,000, etc. It is to be understood that the calibrations for each log cycle shall be logarithmic in nature and such calibrations can readily be made by anyone familiar with this art. Further, in the above description, common logarithms with the base 10 have been used throughout.

3. *Scale alignment.*—FIG. 9 of the drawings illustrates schematically the longitudinal alignment of the five scales of the gear selector 24 when the scales are oriented with the origin of the horsepower scale 43 (where horsepower equals 1) located on the slide member 42 aligned with the origin of the gear r.p.m. scale 38 (where gear r.p.m. equals 1) on the front panel of outer case 25. With scales 43 and 38 so oriented, the origin of the gear ratio scale 39 may be located at any convenient position on the front panel of outer case 25, it being understood that the scale should be parallel to scales 43 and 38 and that the position selected will determine the location of the slot in which pivot pin 52 slides. The origin of the pitch diameter scale 44 (where pitch diameter equals 10 inches) is spaced to the left of the origin of the gear ratio scale 39 at a distance shown as ($f$) in FIG. 9. Similarly, the origin of the face width scale 45 (where face width equals 1 inch) is spaced to the left of the origin of the gear ratio scale 39 at a distance shown as ($g$) in FIG. 9. The distances ($f$) and ($g$) are listed on line 1 of table II in terms of the "base unit" described above. After having located the origins of the respective scales, each scale may be constructed in accordance with the preceding description.

In addition to the longitudinal displacement described above, the gear ratio, pitch diameter, and face width scales are displaced laterally from one another at distances shown as ($h$) and ($k$) in FIG. 9. Although the distances ($h$) and ($k$) may be given any desired value, the ratio of $$\frac{k}{h}$$

should be approximately 2.3, with 2.257 considered preferable from the standpoint of accuracy. Except for the limitation that ($h$) and ($k$) bear substantially said ratio to one another, the lateral distances between the five scales may be varied as desired.

As illustrated in FIG. 1, it is not necessary to show a complete range of variables for each of the five scales of the slide rule gear selector 24. Thus, it has been found convenient to plot a range of horsepower values from 1 to 10,000, a gear r.p.m. range from 1 to 400, a gear ratio range from 5:1 to 18:1, a pitch diameter range from 40 inches, and a face width range from 5 inches to 38 inches. Where a portion only of a particular scale is to be provided on the gear selector, it is preferable to first locate the origin of that scale in accordance with the foregoing description and subsequently select the desired portion, so as to maintain the proper scale alignment and scale calibration.

TABLE II

| Gear Type | $f$ | $g$ |
|---|---|---|
| 1. 25° Pressure Angle, Single Helical or Continuous Herringbone, Full Depth Tooth Form | 0.530 | 0.877 |
| 2. 20° Pressure Angle, Single Helical or Continuous Herringbone, Stub Tooth Form | 0.577 | 0.928 |

Because the durability rating of a gear varies in proportion to the hardness of the gear material, it is preferable to construct a slide rule gear selector based upon a gear material of specified Brinell hardness number and correct for the use of gear materials with different hardness ratings by means of multiplying factors. Thus, in the present instance, the gear selector 24 has been set up for a gear material of 180 Brinell hardness number. When it is desired to compute the rating of a gear made of a different material, the appropriate factor from table III is used to convert the rating obtained from the selector for a gear of 180 Brinell hardness number. The factors listed in table III are standard factors published by AGMA and are listed herein for convenience. If desired, a table of such factors may be printed on the rear panel 27 of the outer case 25 of the slide rule gear selector 24.

TABLE III
Gear Hardness of Rule-180

| Gear hardness for which new rating is desired: | Multiplying factor |
|---|---|
| 180 | 1.00 |
| 210 | 1.19 |
| 225 | 1.30 |
| 245 | 1.46 |
| 265 | 1.63 |
| 285 | 1.82 |
| 300 | 1.98 |
| 310 | 2.09 |
| 335 | 2.40 |
| 360 | 2.73 |
| 375 | 2.94 |
| 400 | 3.30 |
| 435 | 4.00 |

To illustrate the use of table III, a gear of 300 Brinell hardness material will have a durability rating equal to 1.98 times the rating for a gear of the same dimensions (pitch diameter and face width) made of a material with a 180 Brinell hardness rating.

The face width scale 45 described above refers to the net face width of a gear having teeth that extend across the entire face width of the gear, as in single-helical gears and double-helical gears which have no gap between the right and left hand helical teeth. However, some double-helical gears have a space between the right and left hand tooth portions resulting in a loss of face width that must be compensated for in order to adapt the rule described above for selection of these "gapped" double-helical gears. This loss of face width may be most readily accounted for by the use of empirical factors that will vary in accordance with the magnitude of the gap in relation to the face width and pitch diameter of the gear. There are no standards for the width of the gap between the right and left hand helical teeth of these "gapped" double-helical gears and, hence, the factors must be calculated for the particular types of gears actually constructed. For this reason no factors to apply to the rating obtained from the slide rule gear selector 24 for a single or continuous double-helical gear to convert said rating into one for a "gapped" double-helical gear are included in the present description. However, one skilled in the art may readily calculate empirical factors for this use and, hence, the rule as described is adaptable for the selection of "gapped" double-helical gears. A table of such factors may be conveniently printed on the rear panel 27 of the slide rule gear selector 24.

The scales that are provided on the slide rule gear selector described, are proportioned to yield gear ratings which will conform to the ratings obtained from the AGMA surface durability rating formula, within the limits of the accuracy of the rule. Since the AGMA formula is an empirical formula based upon the experience of a great many gear manufacturers, it is subject to change. That is, one or more of the factors used in the AGMA formula may be modified to reflect changes in current experience with gear ratings. In such event, the rule described may be modified in a number of ways to reflect future changes in the AGMA formula such as, for example, by slight longitudinal realignment of the scales or changes in the dimensions and proportions of the scales themselves. Those skilled in the art will be able to make such changes as may become necessary, based upon the disclosures of this specification and within the scope of this invention.

B. Gear Selector For 20° Pressure Angle Stub Tooth Form, Single Helical and Double Helical Gears A slide rule gear selector for the selection of gears having a 20° pressure angle stub tooth form may be constructed in accordance with the present invention. The 20° tooth form slide rule gear selector may be constructed having the same outer case and slide members and provided with scales of the same type and proportions as described above. Due to the similarity, no separate figure is included to illustrate this embodiment. The only change necessary is the use of different values for the longitudinal offset $(f)$ between the origin of the pitch diameter scale and the origin of the gear ratio scale and the longitudinal offset $(g)$ between the origin of the face width scale and the origin of the gear ratio scale, see FIG. 9. The value of $(f)$ for a slide rule gear selector for the selection of 20° pressure angle stub tooth form gears may be 0.577, while the value of $(g)$ may be 0.928. The $(f)$ and $(g)$ values for this embodiment of the present invention are listed on line 2 of the table II. The selection of 20° pressure angle stub tooth form double-helical gears having a gap between the right and left hand helical threads is accomplished through the use of empirical factors in the manner described above for the selection of "gapped" double-helical gears of the 25° pressure angle tooth form. This embodiment is also preferably based upon gear material of 180 Brinell hardness number, with use of harder materials compensated for by use of table III.

II. SPECIALIZED GEAR SELECTORS

The principles of the present invention may be utilized to construct slide rule gear selectors for the selection of gears having a predetermined relationship between pitch diameter and face width. It is common practice to construct gears in a range of sizes wherein the face width bears a constant mathematical ratio to the pitch diameter throughout the size range. Accordingly, the embodiments described below illustrate the use of the present invention for construction of slide rule selectors which are adapted to permit the selection of gears having predetermined face width to pitch diameter ratios, herein denominated as "specialized gear selectors."

Figure 10:
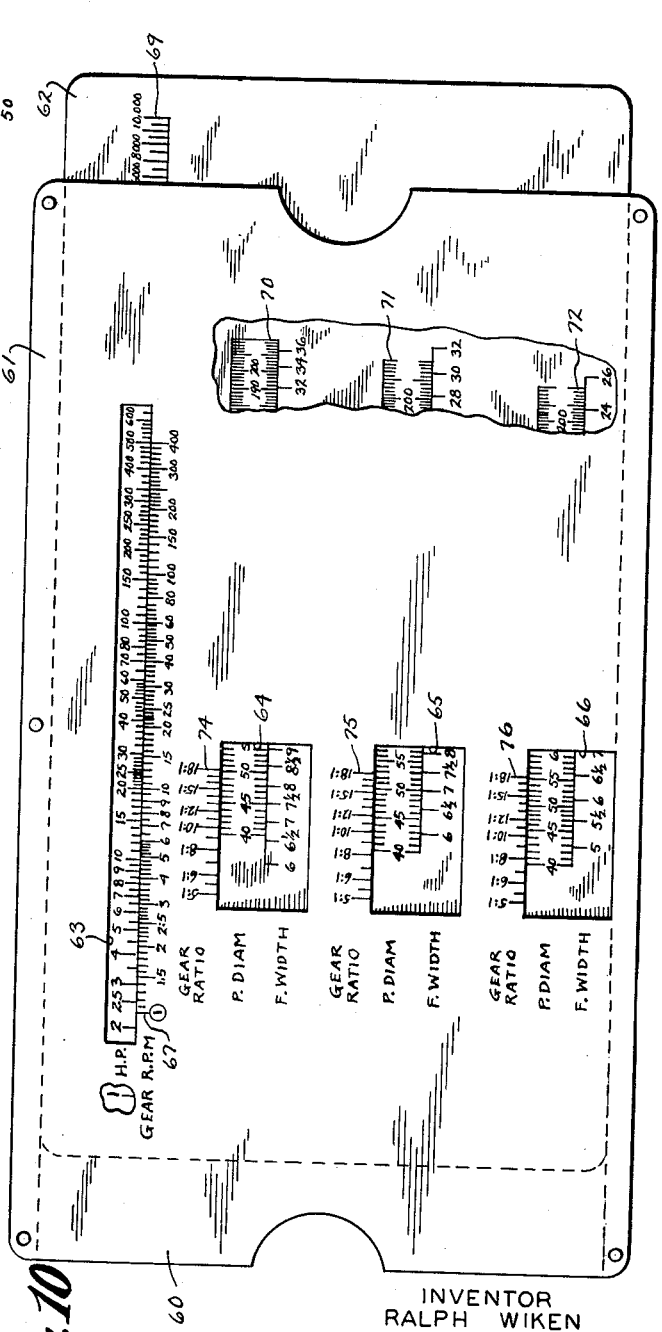
FIG. 10 is a front elevation view of another form of slide rule gear selector embodying this invention.

A. Specialized Slide Rule Gear Selector for 25° Pressure Angle, Full Depth Tooth Form, Single Helical and Double Helical Gears Illustrated in FIGS. 10, 11 and 12 is a gear selector 60 adapted for the selection of single helical and continuous double-helical gears having predetermined face width to pitch diameter ratios. As illustrated in FIG. 10, the gear selector 60 comprises an outer case 61 and a slide member 62 arranged to slide within a longitudinal channel defined between front and rear panels of the outer case 61 with upper and lower spacers therebetween. As illustrated in FIG. 10, this embodiment of the present invention does not utilize a pointer, although the other structural features are similar to the embodiments described heretofore and will, therefore, not be repeated. The outer case 61 has a series of four windows cut in the front panel thereof, 63, 64, 65 and 66. Imprinted or otherwise applied on the front panel of the outer case 61 is a gear r.p.m. scale 67 located adjacent window 63, and a series of similar gear ratio scales 74, 75 and 76 located adjacent windows 64, 65 and 66, respectively. Imprinted or otherwise applied on the slide member 62 is a horsepower scale 69 arranged to underlie window 63 and a series of pitch diameter-face width conversion scales 70, 71 and 72 arranged to underlie windows 64, 65 and 66, respectively. Windows 63, 64, 65 and 66 are proportioned to permit observation therethrough of portions of scales 69, 70, 71 and 72 respectively.

The gear r.p.m. scale 67 and the horsepower scale 69 are non-uniform logarithmic scales similar to the gear r.p.m. scale 38 and the horsepower scale 43 described previously for the gear selector 24 and have the same cycle multipliers and length factors. The gear ratio scales 74, 75 and 76 are non-uniform logarithmic scales similar to the gear ratio scale 39 described previously, except that different cycle multipliers and length factors are used. The pitch diameter-face width conversion scales of the present embodiment, 70, 71 and 72, respectively, are non-uniform logarithmic scales which have pitch diameter calibrations on one side of line (1), FIG. 11, and face width calibrations on the opposite side of line (1). If desired, the pitch diameter portion of scales, 70, 71 and 72 may be repeated slightly above the scales to aid in setting pitch diameter values under gear ratio values, as shown in FIG. 10. The face width calibrations of FIG. 10 are plotted as functions of the pitch-diameter calibrations according to the following formulae:

(1) scale 70: face width $= \dfrac{\text{pitch diameter}}{6}$ (2) scale 71: face width $= \dfrac{\text{pitch diameter}}{7.15}$ (3) scale 72: face width $= \dfrac{\text{pitch diameter}}{8.60}$ The data necessary to construct the gear ratio scales 74, 75 and 76 and the pitch diameter portion of the pitch diameter-face width conversion scales 70, 71 and 72 may be obtained from table IV, and the data for the horsepower scale 69 and gear r.p.m. scale 67 may be obtained from table I above. The construction and calibration of these scales is in all respects similar to that described previously and, hence, need not be repeated here.

TABLE IV

| Scale | Range of Values of First Log Cycle | Length of First Log Cycle (Fig. 12) | Length Factor | Cycle Multiplier |
|---|---|---|---|---|
| Gear Ratio (Scales 74, 75, 76) | 1:1 to 10:1 | $m_1$ | 0.926 | 1.092 |
| Pitch Diameter: | | | | |
| (1) Scale 70 | 10″ to 100″ | $n_1$ | 2.776 | 1.058 |
| (2) Scale 71 | 10″ to 100″ | $n_2$ | 2.754 | 1.058 |
| (3) Scale 72 | 10″ to 100″ | $n_3$ | 2.726 | 1.058 |

FIG. 12 illustrates schematically the longitudinal alignment of the scales provided on the gear selector 60. With the origin of the horsepower scale 69 (where horsepower equals 1) on the slide member 62 placed in alignment with the origin of the gear r.p.m. scale 67 (where gear r.p.m. equals 1) on the outer case 61, the origins of the gear ratio scales 74, 75 and 76 (where gear ratio equals 1:1) may be positioned at any desired position with respect thereto. After having located the origins of the gear ratio scales, the origin of the pitch diameter-face width conversion scale 70 is located a distance $(p)$ to the left of the origin of the gear ratio scale 74; the origin of the pitch diameter-face width conversion scale 71 is located a distance $(q)$ to the left of the origin of the gear ratio scale 75; and the origin of the pitch diameter-face width conversion scale 72 is located a distance $(r)$ to the left of the origin of the gear ratio scale 76. The values of $(p)$, $(q)$ and $(r)$ are listed in table V and are expressed as functions of the "base unit," i.e. the length of the first logarithmic cycle of the horsepower scale. As an example, the origin of scale 70 is longitudinally offset to the left of scale 75 a distance $(p)$ equal to 0.422 times the length of the "base unit."

TABLE V

| Scale | Conversion Formula | Longitudinal Offset Based on "Base Unit" (Fig. 12) |
|---|---|---|
| Scale 70 | Face Width = $\dfrac{\text{Pitch Diameter}}{6.00}$ | $(p) = 0.422$ |
| Scale 71 | Face Width = $\dfrac{\text{Pitch Diameter}}{7.15}$ | $(q) = 0.472$ |
| Scale 72 | Face Width = $\dfrac{\text{Pitch Diameter}}{8.60}$ | $(r) = 0.499$ |

The longitudinal offset between the origins of the gear ratio scales and the pitch diameter-face width conversion scales, $(p)$, $(q)$ and $(r)$ will vary in accordance with the dimensions of the particular gears for which the gear selector may be adapted. Thus, the values given for $(p)$, $(q)$ and $(r)$ in table V obtain for three types of hub gears, namely what is termed short center, wide face (scale 70), medium center, medium face (scale 71), and long center, narrow face (scale 72) gears having pitch diameter:face width ratios equal to 6.0, 7.15 and 8.60 respectively. The rule may be constructed for the selection for gears of other dimensions, the examples given for scales 70, 71 and 72 being illustrative only. To aid those skilled in the art to adapt the slide rule gear selector herein described for gears of predetermined pitch diameter:face width ratios, the following empirical formula for the longitudinal offset between the origins of the gear ratio and pitch diameter-face width conversion scale may be used:

$$\text{Offset} = 0.413 + \sqrt{0.003Y - 0.01788}$$

Equation (1)

The symbol $Y$ in Equation (1) is equal to the pitch diameter divided by the face width.

By calculation of the longitudinal offset through substitution in Equation (1), those skilled in the art will be to properly align gear ratio and pitch diameter-face width conversion scales for a wide variety of gears having a predetermined pitch diameter:face width relationships.

As was pointed out in the description of the embodiments of the present invention described in part I above, the gear selector 60 has been set up for a gear material of 180 Brinell hardness number, and the multiplying factors from table III may be used to convert the durability rating obtained from the rule to one for gears made of a harder material. Similarly, the remarks made under part I, A., relating to the selection of "gapped" double-helical gears and changes in the AGMA surface durability rating formulae also apply to this embodiment of the invention and, hence, need not be repeated here.

*B. Specialized Gear Selector for 20° Pressure Angle, Stub Tooth Form, Single Helical and Double Helical Gears*

The slide rule gear selector 60 may also be adapted for the selection of gears having a 20° pressure angle stub tooth form. This embodiment is similar in all respect to that described in II, A, above, except that the longitudinal offset between the gear ratio scale and pitch diameter:face width conversion scale must be altered. The longitudinal offset for this embodiment may be calculated from the following empirical formula:

$$\text{Offset} = 0.462 + \sqrt{0.003Y - 0.01788}$$

Equation (2)

As in Equation (1) above, $Y$ is equal to the pitch diameter divided by the face width. Thus, after constructing and calibrating scales of the proper dimensions, the scales may be aligned by use of Equation (2).

Again, remarks made previously relating to the use of gear materials of different Brinell hardness number, selection of "gapped" double-helical gears, and changes in the AGMA durability rating formulae apply to this embodiment of the present invention.

III. OPERATION

Two examples are given below to illustrate the operation of the slide rule gear selectors herein disclosed for the selection of a gear having suitable pitch diameter and face width proportions for the application under consideration. In each of the examples, it will be assumed that the person selecting the gear has an application under consideration wherein he desires to select a gear to drive a particular machine from a motor of known output horsepower operating through a speed reduction gear train of known gear ratio. It is common practice in this type of situation to compute the maximum power which the gear will be required to transmit by applying a set of three AGMA factors to the motor output horsepower; a service factor (SF) to correct for high dynamic loads, a gear position factor (J) to compensate for both the cushioning of dynamic loading and the increased torque effect associated with later stages of speed reduction in relation to the power source, and a work hardening factor (W) that is used in some applications to compensate for the work hardening effect between a pinion and a driven gear involving gear ratios higher than 8:1. AGMA has published lists of these factors that are generally available and they are, therefore, not included in this disclosure, although in many instances it may be preferred to provide tables of such factors on the rear panel of the slide rule gear selectors of the present invention.

*Example I*

To illustrate operation of the slide rule gear selector 24 shown in FIGS. 1-9, assume that it is desired to select a 25° pressure angle full depth tooth form gear to rotate at 80 r.p.m. to drive a hoist from a 200 horsepower motor coupled to a conventional single reduction speed reducer having a 12:1 gear ratio for 8 to 10 hours of service per day under uniform load conditions. The total expected load to be transmitted by the gear is found by multiplying 200 horsepower by SF, W and J factors appropriate for this situation, which from published AGMA tables are 1.00, 1.00 and 0.75 respectively. The $200 \times 1.00 \times 1.00 \times 0.75$ equals 150 horsepower. Referring now to FIG. 1, the slide member 42 is moved to set 150 on the horsepower scale 43 over 80 on the gear r.p.m. scale 38. The pointer 50 is moved within the slot 33 until the pivot pin 52 of the pointer is set adjacent 12:1 on the gear ratio scale 39 and, with the pivot pin 52 held in this position, pointer 50 may be pivoted to select a series of pitch diameter and corresponding face width dimensions that a gear should have for this application, as judged by AGMA standards. With pointer 50 positioned as shown in FIG. 1, the appropriate pitch diameter dimension is the nearest whole number on scale 44 to the right of the hairline 53 of the pointer, or 46 inches, and the corresponding face width is the nearest whole number on scale 45 to the right of the hairline 53, or 8 inches. Thus, a 25° pressure angle, full depth tooth form single helical or continuous double-helical gear having a pitch diameter of 46 inches and a face width of 8 inches will be appropriate for the application under consideration. If desired, other pitch diameter-face width combinations appropriate for this application may be selected from the rule and the final selection ultimately determined on the basis of available sizes of gears or, in some cases, space limitations.

*Example II*

To illustrate operation of the slide rule gear selector 60 shown in FIGS. 10–12, assume that a 25° pressure angle, full depth tooth form, hub gear is to be selected to drive a machine at 220 r.p.m. from a 400 horsepower electric motor coupled to a 12:1 conventional single reduction speed reducer for a normal period of service of three hours per day. Assuming moderate duty load characteristics for the driven machine and second reduction position for the gear to be selected in relation to the driving source, the appropriate AGMA values for SF, W and J are 1.00, 1.00 and 0.75 respectively. Thus, 400×1.00×1.00×0.75 equals 300 horsepower. As shown in FIG. 10, slide 62 is moved so as to position 300 on the horsepower scale 69 over 220 on the gear r.p.m. scale 67 and the appropriate pitch diameter-face width combinations are read from the pitch diameter-face width conversion scales 70, 71 and 72 adjacent 12:1 on the gear ratio scales 74, 75 and 76 respectively. From scale 70 the pitch diameter is read as 44 inches, to the nearest inch, and the face width is read as the nearest numeral to the right of the gear ratio, or 7½ inches; from scale 71 the pitch diameter is read as 46 inches and the face width as 6½ inches; and from scale 72 the pitch diameter is read as 47 inches and the face width as 5½ inches. Thus, a 25° pressure angle, full depth tooth form, single helical or continuous double-helical gear that has a pitch diameter:face width ratio equal to 6.00 and that has a 44 inch pitch diameter and 7½ inch face width is appropriate for the application under consideration; and for a similar gear having a pitch diameter:face width ratio equal to 7.15, the appropriate gear dimensions are 46 inch pitch diameter and 6½ inch face width; and for a similar gear having pitch diameter:face width ratio equal to 8.60, the appropriate dimensions are 47 inch pitch diameter and 5½ face width.

From the above description and foregoing examples, it will be apparent to those skilled in the art that this invention provides a unique slide rule gear selector that greatly facilitates the selection of gears in accordance with accepted engineering standards, such as those set up by the American Gear Manufacturers' Association. It has been found that the gear selections of the present invention are quite accurate and results computed therefrom are substantially in agreement with results computed by empirical substitution in the published AGMA formulae. On the basis of 450 selections made with the embodiment shown in FIGS. 10–12, it has been found that 95% were within 5% of the results obtained through substitution in the AGMA formula. It is estimated that 90% of the results obtained from the universal gear selector shown in FIGS. 1–9 will be within 5% of the results obtained through substitution in the AGMA formula. It is apparent that the accuracy obtainable from the slide rule gear selector will largely depend upon the accuracy in which the scales are laid out and proportioned, and that a high degree of accuracy is obtainable. While the numerical values of the various scale dimensions for both scale calibration and alignment have been expressed accurately to either two or three decimal places, it is expected that those skilled in the art will be able to vary these dimensions and still remain within the scope of this invention. The dimensions disclosed hereinabove are those which have proved most satisfactory from the standpoint of accuracy and are therefore considered preferable for the particular gear tooth forms to which they pertain. Other tooth forms may require different dimensions and, in some applications, satisfactory accuracy may be obtained with dimensions that vary from those disclosed.

I claim:

1. A selector for gears having a predetermined involute tooth form comprising, in combination: a pair of members movable with respect to one another; one of said members having first, second and third windows and a narrow slot with a logarithmic gear r.p.m. scale adjacent the first window and a logarithmic gear ratio scale adjacent the narrow slot; a logarithmic horsepower scale and a logarithmic pitch diameter scale and a logarithmic face width scale on the other of said members, a portion of said horsepower scale underlying said first window and viewable therethrough, a portion of said pitch diameter scale underlying said second window and viewable therethrough and a portion of said face width scale underlying said third window and viewable therethrough; and a pointer member arranged for pivotal and sliding movement relative to said pair of members, said pointer member having a visible center line adapted to overlie selected portions of said pitch diameter and face width scales and a pivot pin arranged within said narrow slot; said scales being laterally and longitudinally aligned and the lengths of successive logarithmic cycles on each of said scales being calibrated to permit selection of gears in accordance with preselected surface durability rating formulae.

2. A selector for gears having a predetermined involute tooth form comprising, in combination: an outer case having front and rear panels joined together in spaced apart relationship to define a longitudinal channel therebetween; a slide movable within said channel relative to said outer case; a first window in the front panel of said outer case; a logarithmic gear r.p.m. scale on the front panel adjacent said first window; a logarithmic horsepower scale on said slide, a portion of said horsepower scale underlying said first window and viewable therethrough; a second window in the front panel of said outer case; a logarithmic pitch diameter scale on said slide, a portion of said pitch diameter scale underlying said second window and viewable therethrough; a third window in the front panel of said outer case; a logarithmic face width scale on said slide; a portion of said face width scale underlying said third window and viewable therethrough; a narrow slot in the front panel of said outer case; a logarithmic gear ratio scale on said front panel adjacent said narrow slot; a pointer member between said outer case and slide having a center line visible through said second and third windows and further having a pivot pin within said narrow slot, said pointer being slidable along said slot and pivotable about said pin; said scales being laterally and longitudinally aligned and the lengths of successive logarithmic cycles on each of said scales being calibrated to permit selection of gears in accordance with preselected durability rating formulae.

3. A selector according to claim 2 wherein said horsepower, gear r.p.m. and gear ratio scales are non-uniform logarithmic scales having the lengths of successive logarithmic cycles therein arranged in geometric progression and said pitch diameter and face width scales are uniform logarithmic scales with successive logarithmic cycles of equal length.

4. A selector according to claim 3 adapted for selection of single helical and continuous double-helical gears having a 25° pressure angle involute full depth tooth form, wherein said horsepower, gear r.p.m. and gear ratio scales have cycle multipliers substantially equal to 1.024, 0.948 and 1.136 respectively; and said gear r.p.m., gear ratio, pitch diameter and face width scales have length factors substantially equal to 0.969, 0.934, 2.838 and 2.835 respectively; the pitch diameter scale being laterally spaced apart from the gear ratio scale on one side thereof and the face width scale being laterally spaced apart from the gear ratio scale on the opposite side thereof at a lateral distance substantially equal to 2.257 times that for the pitch diameter scale; and the point on the pitch diameter scale at which pitch diameter equals 10″ and the origin of the face width scale both being longitudinally offset to the left of the origin of said gear ratio scale, the ratio of said offsets to the length of the logarithmic cycle of the horsepower scale wherein horsepower varies from 1 to 10 being substantially equal to 0.530 and 0.877 respectively.

5. A selector according to claim 2 adapted for selection of single helical and continuous double-helical gears having a 20° pressure angle involute stub tooth form, wherein said horsepower, gear r.p.m. and gear ratio scales have cycle multipliers substantially equal to 1.024, 0.948 and 1.136 respectively; the length factors of said gear r.p.m., gear ratio, pitch diameter, and face width scales being substantially equal to 0.969, 0.934, 2.838 and 2.835 respectively; the pitch diameter scale being laterally spaced apart from the gear ratio scale on one side thereof and the face width scale being laterally spaced apart from the gear ratio scale on the opposite side thereof at a lateral distance substantially equal to 2.257 times that for pitch diameter scale; and the point on the pitch diameter scale at which pitch diameter equals 10″ and the origin of the face width scale both being longitudinally offset to the left of the origin of said gear ratio scale, the ratio of said offset to the length of the logarithmic cycle of the horsepower scale wherein horsepower varies from 1 to 10 being substantially equal to 0.577 and 0.928 respectively.

References Cited in the file of this patent

UNITED STATES PATENTS

| | | |
|---|---|---|
| 1,520,105 | Bicknell | Dec. 23, 1924 |
| 2,959,346 | Decker | Nov. 8, 1960 |